United States Patent Office 3,188,147
Patented June 8, 1965

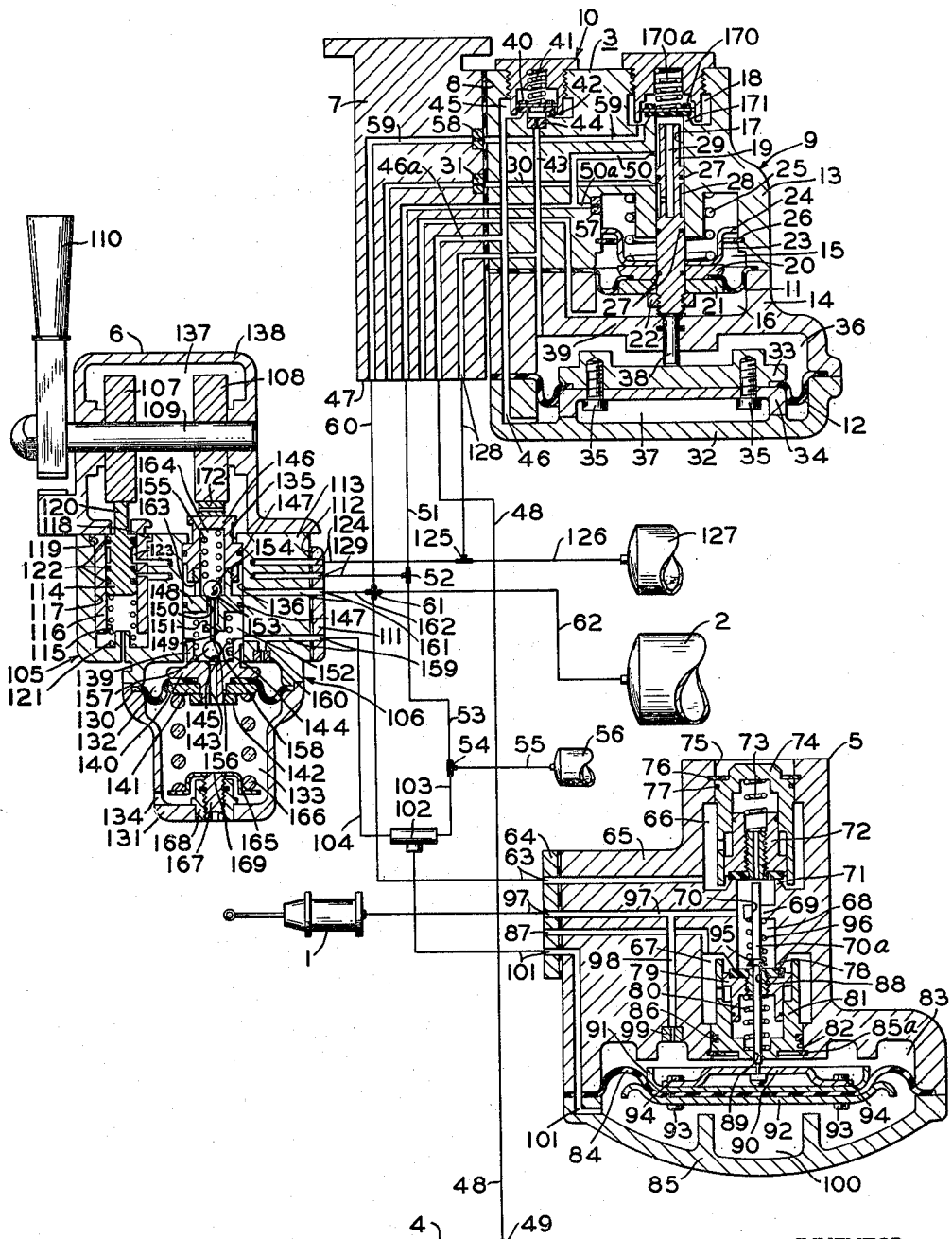

3,188,147
LOCOMOTIVE VACUUM BRAKE EQUIPMENT WITH INDEPENDENT QUICK RELEASE OF AUTOMATIC BRAKE APPLICATION
James F. Ferguson, Irwin, Pa., assignor to Westinghouse Air Brake Company, Wilmerding, Pa., a corporation of Pennsylvania
Filed Dec. 6, 1963, Ser. No. 328,733
6 Claims. (Cl. 303—4)

This invention relates to combined compressed air and vacuum operated brake equipment for multi-unit railway locomotives, and, more particularly, to an improved manually operated independent quick release apparatus for effecting a more rapid release of the brakes on the locomotive, without effecting a release of the brakes on the cars in a train hauled by the locomotive, than is possible with heretofore known combined compressed air and vacuum operated brake equipments for multi-unit railway locomotives.

In apparatus of the above general type, it has heretofore been the practice to provide on each locomotive unit a diaphragm operated brake control valve device for effecting, through the intermediary of a relay valve device, respectively, the supply and release of fluid under pressure from a suitable storage reservoir to a brake cylinder device to atmosphere in accordance with variations in the subatmospheric pressure or vacuum to which the respective opposite sides of the diaphragm are normally subjected, effected by operation of a vacuum control valve device in response to variations in pressure in a fluid pressure brake pipe, the variations in pressure in the fluid pressure brake pipe being caused by manual operation by the engineer on the leading unit of a multi-unit locomotive of an engineer's automatic brake valve device on the leading locomotive unit.

Furthermore, in apparatus of the above general type, it has been the practice to provide on each locomotive a manually operative independent brake valve device by which the engineer can effect, subsequent to effecting a brake application on the locomotive and the cars in a train by means of the engineer's automatic brake valve device, an equalization of the subatmospheric pressures or vacuum on the opposite sides of the diaphragm of the brake control valve device on the locomotive to cause a release of the brakes on the locomotive without effecting a release of the brakes on the cars in the train.

It is the general object of this invention to provide apparatus for effecting a more rapid independent release of the brakes or the locomotive, subsequent to effecting a brake application on the locomotive and the cars in a train by means of the engineer's automatic brake valve device, than has been heretofore obtained by effecting an equalization of the subatmospheric pressures or vacuum on the opposite sides of the diaphragm of the brake control valve device on the locomotive, by supplying fluid at super or above atmospheric pressure to that side of the diaphragm of the brake control valve device on the locomotive that is subject to the higher vacuum to cause the diaphragm to rapidly deflect in the direction to operate the brake control valve device to effect a quick release of the brakes on the locomotive.

In apparatus of the above-mentioned general type, the fluid under pressure supplied by operation of the diaphragm-operated brake control valve device controls the operation of a diaphragm-operated relay valve device which, in turn, respectively, effects the supply of fluid under pressure from the storage reservoir to a brake cylinder device located on the locomotive and the release of fluid under pressure from this brake cylinder device to atmosphere to control the brakes on the locomotive.

Essentially, the invention comprises, for each unit of a multi-unit locomotive, a manually operated independent brake valve device having a cam-operated piston valve manually operable to a position to establish a communication between the diaphragm-operated relay valve device and the side of the diaphragm of the brake control valve device on the locomotive that, subsequent to effecting a brake application by manual operation of the engineer's automatic brake valve device, is subject to the higher vacuum, whereby the fluid under pressure previously supplied by the brake control valve device to the relay valve device to cause the operation thereof to effect an application of the brakes on the locomotive, is released from the relay valve device to the side of the diaphragm of the brake control valve device that is subject to the higher vacuum, to quickly establish a pressure differential on said side of the diaphragm to deflect it in the direction to cause the brake control valve device to operate to effect, through the intermediary of the relay valve device, a quick release of the brakes on the locomotive.

By using fluid under pressure from the relay valve device to cause the brake control valve device to operate to release fluid under pressure from the relay valve device to atmosphere, the control pressure acting on the relay valve device is reduced more rapidly than if this reduction is effected only after the brake control valve device has returned to its brake release position. Accordingly, it is apparent that this more rapid reduction in the relay valve device control pressure causes the relay valve device to effect a quicker release of the brakes on the locomotive.

In the accompanying drawing:

The single figure is a diagrammatic view of that portion of a combined automatic compressed air and vacuum operated locomotive brake equipment for one unit of a multi-unit locomotive embodying the invention and comprising a novel independent brake release means for effecting a quick release of the brakes on the locomotive independently of the brakes on the cars in a train hauled by the locomotive.

*Description*

Referring to the drawing, that portion of a combined automatic compressed air and vacuum operated locomotive brake equipment for one unit of a multi-unit locomotive that embodies the present invention comprises a brake cylinder device 1, a main reservoir 2, a brake control valve device 3 connected to a vacuum brake pipe 4 that extends from the locomotive back through each car in a train, and controlled by variations in pressure in the vacuum brake pipe 4, a self-lapping type relay valve device 5 operative by fluid under pressure supplied thereto from the main reservoir 2 by operation of the brake control valve device 3, in a manner hereinafter explained in detail, to effect the supply of fluid under pressure from the main reservoir 2 to the corresponding brake cylinder device 1 to apply the brakes on the respective unit of the multi-unit locomotive, and a manually operative self-lapping type independent brake valve device 6 for controlling the brakes on the locomotive independently of the brakes on the cars in the train, in a manner hereinafter described in detail.

The brake control valve device 3 comprises a pipe bracket 7 having a face 8 on which is mounted a service valve device 9 that has a check valve device 10, the purpose of which is hereinafter made apparent.

Briefly, the service valve device 9 preferably comprises two coaxially arranged movable abutments or diaphragms 11 and 12 of different effective areas cooperatively, though not positively, connected so as to constitute a stack, as will be understood from subsequent description. The outer periphery of the smaller diaphragm 11 is clamped between two casing sections 13 and 14 comprising a sectionalized casing of the service valve device 9.

These casing sections are secured together by any suitable means (not shown).

The diaphragm 11 cooperates with the casing sections 13 and 14 to form within the service valve device 9 and on opposite sides of the diaphragm a first pair of chambers 15 and 16, the latter being opened to atmosphere.

The casing section 13 of the service valve device 9 is provided with a bore 17 which opens at one end into a chamber 18 adjacent the upper end of the casing section 13 and which opens at the other end into the chamber 15. Slidably mounted in the bore 17 is a valve stem 19, the lower end of which extends through two diaphrgam followers 20 and 21, disposed on opposite sides of the diaphragm 11, and is screw threaded to receive a nut 22 which has screw-threaded engagement with this end of the valve stem 19 to operatively connect the center of the diaphragm 11 to the diaphragm followers 20 and 21 and to the valve stem 19. Resting against the upper side of the diaphragm follower 20 is a cup-shaped spring seat 23 having a peripheral annular flange 24. Disposed within the chamber 15 between the casing section 13 and the spring seat 23 is a spring 25 for biasing the valve stem 19 and the diaphragm 11 in a downward direction. The spring 25 and spring seat 23 are retained in the chamber 15 by means of a snap ring 26 that is inserted in a groove formed in the wall of casing section 13.

The valve stem 19 is provided with three axially spaced-apart peripheral annular grooves in each of which is disposed an O-ring seal 27 to prevent leakage of fluid under pressure between the periphery of the valve stem and the wall of the bore 17, and between the chambers 15 and 16. The valve stem 19 has formed thereon intermediate its ends a peripheral annular groove 28 which, as shown in the drawing illustrating the relative positions of the parts of the service valve device 9 in the brake release position, is so located that the upper end of the bore 17 is open to atmosphere via a passageway 29 extending from the upper end of the valve stem 19 longitudinally therethrough to the location thereon at which the peripheral annular groove 28 is formed, and thence crosswise the valve stem 19 so as to open at the surface of the groove 28, and then via a passageway 30 extending through the casing section 13 and the pipe bracket 7 and a brake cylinder exhaust control choke 31 in the pipe bracket 7.

The outer periphery of the larger diaphragm 12 is clamped between the casing section 14 and a cover 32 which is secured to the casing section 14 by any suitable means (not shown). The center of the larger diaphragm 12 is clamped between two diaphragm followers 33 and 34 which are secured together by a plurality of cap screws 35 that pass through corresponding smooth bores in the diaphragm follower 34 and have screw-threaded engagement with coaxial threaded counterbores in the diaphragm follower 33.

The large diaphragm 12 cooperates with the casing section 14 and cover 32 to form within the service valve device 9 and on opposite sides of the diaphragm 12, a second pair of chambers 36 and 37. A cylindrical pusher stem 38 arranged coaxially with the movable abutments or diaphragms 11 and 12 has sealing, slidably guided contact with the wall of an aligned bore through a casing partition 39 separating the chamber 36 from the chamber 16, the ends of the pusher stem 38 abuttingly contacting, respectively, the lower end of the valve stem 19 and the upper side of the diaphragm follower 33.

The hereinbefore-mentioned check valve device 10 comprises a flat disc type valve 40 that is normally urged by a light bias spring 41 into seating contact with an annular valve seat 42 formed adjacent one end of a passageway 43 in the casing section 13, the opposite end of which passageway 43 opens into the chamber 36 above the larger diaphragm 12. Disposed in the passageway 43 is a choke 44 to control the rate of one-way flow of fluid under pressure from the chamber 36, upon unseating of the flat disc type check valve 40 from the annular valve seat 42, to an outlet chamber 45. The outlet chamber 45 is in constant communication with the chamber 37 below the larger diaphragm 12 by way of a passageway 46 extending from the chamber 45 through the casing sections 13 and 14 and the cover 32. A branch passageway 46a extends through the casing section 13 and the pipe bracket 7 and opens at a flat face 47 formed on the lower side of the pipe bracket 7. The end of the branch passageway 46a opening at the flat face 47 of the pipe bracket 7 is provided with a tapped port into which is received one threaded end of a pipe 48. The opposite end of the pipe 48 is connected to the side outlet of a pipe T 49 disposed in the vacuum brake pipe 4.

Opening at the wall surface of the bore 17 is one end of a passageway 50 that extends through the casing section 13 and the pipe bracket 7 to a tapped port opening at the lower face 47 of the pipe bracket 7 and into which is received one threaded end of a pipe 51 that is connected at its other end to the upper end of a pipe T 52 the lower end of which is connected by a pipe 53 to the upper end of a pipe T 54 the side outlet of which is connected by a pipe 55 to a volume reservoir 56, the purpose of which is to provide proper regulation of the operation of the self-lapping type relay valve device 5. A branch passageway 50a having therein a choke 57 connects the passageway 50 to the chamber 15 above the diaphragm 11.

In order that the chamber 18 may be constantly supplied with fluid under pressure from the main reservoir 2 at a rate determined by a service choke 58, the chamber 18 is connected by a passageway 59 that extends through the casing section 13 and the pipe bracket 7 to a tapped port opening at the bottom face 47 of the pipe bracket 7 and into which is received one threaded end of a pipe 60 the opposite end of which is connected to one outlet of a pipe cross 61, another outlet of which is connected by a pipe 62 to the main reservoir 2.

A third outlet of the pipe cross 61 is connected by a pipe 63 and a correspondingly numbered passageway extending through a pipe bracket 64 and a body 65 of the hereinbefore-mentioned self-lapping type relay valve device 5 to a supply chamber 66 formed in the body 65.

The supply chamber 66 in the body 65 of the self-lapping relay valve device 5 is connected to an exhaust chamber 67 also formed in the body 65 by a cored passageway 68. Intermediate the ends of the cored passageway 68 and extending into this passageway is a guide member 69 that is formed integral with the body 65 and is provided with a bore 70 through which extends with a sliding fit a valve operating stem 70a. Formed at the upper end of the cored passageway 68 is an annular valve seat 71 against which is normally biased a piston type supply valve 72 by a spring 73 that is interposed between the piston type supply valve 72 and a cylindrical supply valve guide member 74 that is disposed in a bore 75 connecting the supply valve chamber 66 to the exterior of the body 65 and held in place by a snap ring 76 that is inserted in a peripheral annular groove formed in the wall of the bore 75. The supply valve guide member 74 is provided with a peripheral annular groove in which is disposed an O-ring seal 77 that forms a seal with the wall surface of the bore 75 to prevent leakage of fluid under pressure from the supply valve chamber 66 to atmosphere.

Surrounding the lower end of the cored passageway 68 in the body 65 is an annular exhaust valve seat 78 against which a piston type exhaust valve 79 is normally biased by a spring 80 that is interposed between the exhaust valve 79 and an exhaust valve guide member 81 that is disposed in a bore 82 that extends from the exhaust chamber 67 to a chamber 83 formed by the body 65 and a diaphragm 84 that has its outer periphery clamped between the body 65 and a cover member 85. The exhaust valve guide member 81 is retained in the bore 82 by a snap ring 85 that is inserted in a peripheral annular groove formed in the wall surface of the bore 82. The exhaust valve guide member 81 is provided with a peripheral annular groove in which is disposed an O-ring seal 86 that cooperates with the wall surface of the bore 82 to form a seal therewith to prevent flow of fluid under pressure between the chamber 83 and the exhaust chamber 67 which is open to atmosphere via a passageway 87 that extends through the body 65 and the pipe bracket 64 of the self-lapping type relay valve device 5.

The exhaust valve 79 and the exhaust valve guide member 81 are respectively provided with coaxial bores 88 and 89 through which the valve stem 70a extends, the diameter of the bore 89 being substantially the same as that of the bore 70 in the guide member 69 so that the guide member 69 and the exhaust valve guide member 81 serve to guide the valve stem 70a. The valve stem 70a extends into the chamber 83 and is operatively connected to the diaphragm 84 by means of an annular cup-shaped member 90 that is secured to two diaphragm followers 91 and 92, disposed respectively on opposite sides of the center of the diaphragm 84, by a plurality of bolts 93 and nuts 94, two of which appear in the drawing.

That portion of the stem 70a that is disposed in the cored passageway 68 between the exhaust valve seat 78 and the guide member 69 is provided with a collar 95 between which and the guide member 69, and in surrounding relation to the stem 70a, is disposed a spring 96 which serves to bias the upper end of the stem 70a away from the bottom of the piston type supply valve 72 and the lower end of the stem 70a into contact with the upper side of the diaphragm follower 91.

Opening into the cored passageway 68 is one end of a passageway 97 that extends through the body 65 and pipe bracket 64 and is connected by a pipe bearing the same numeral to the brake cylinder device 1. The passageway 97 is connected to the chamber 83 above the diaphragm 84 by a passageway 98 having therein a choke 99 so that fluid under pressure supplied to the brake cylinder device 1 flows to the chamber 83 via passageway 98 and choke 99 at a rate controlled by the size of the choke 99.

The diaphragm 84 and cover 85 cooperate to form a chamber 100 below the diaphragm 84 which chamber is connected by a passageway 101 that extends through the cover 85, body 65, and the pipe bracket 64, and a pipe bearing the same numeral to the side outlet of a double check valve device 102. The right-hand end of the double check valve device 102 is connected by a pipe 103 to that end of the pipe T 54 opposite the end to which the pipe 53 is connected. The opposite or left-hand end of the double check valve device 102 is connected by a pipe 104 to the hereinbefore-mentioned self-lapping type independent brake valve device 6 which will now be described in detail.

The self-lapping type independent brake valve device 6 comprises a quick release valve portion 105 and a self-lapping valve portion 106 embodied in a sectionalized casing and operated respectively by two cams 107 and 108 secured in spaced-apart relation to a cam shaft 109 rotatably mounted in the sectionalized casing and extending at one end to the exterior thereof for receiving thereon an operating handle 110 by which the engineer on a locomotive may effect rotation of the cam shaft 109.

The cams 107 and 108 are of such contour that rotation of the operating handle 110 in one direction out of a normal "Release" position through an application zone to a full application position causes cam 108 to effect operation of the self-lapping valve portion 106 without operation of the quick release portion 105 by the cam 107. Conversely, rotation of the operating handle 110 in the reverse direction from its normal "Release" position into a "Quick Release" position causes cam 107 to operate the quick release portion 105 without operation of the self-lapping valve portion 106 by the cam 108.

The self-lapping type independent brake valve device 6 comprises a pipe bracket 111 having a face 112 on which is mounted a casing section 113 of the sectionalized casing of the self-lapping type independent brake valve device 6.

The quick release valve portion 105 comprises a spool type valve 114 which is slidably mounted in a bore 115 formed in a bushing 116 that is disposed in a bottom bore 117 formed in the casing section 113, the bushing 116 having a collar 118 formed at its upper end which collar is disposed in a counterbore 119 formed in the casing section 113 and coaxial with the bottom bore 117.

The upper end of the spool type valve 114 is provided with a stem 120 which is biased into contact with the cam 107 by a spring 121 that is interposed between the lower end of the spool type valve 114 and the end of the bottom bore 117.

The spool type valve 114 is provided with three spaced-apart peripheral annular grooves in each of which is disposed an O-ring seal 122 to prevent leakage of fluid under pressure between the periphery of the spool type valve 114 and the wall of the bore 115. The spool type valve 114 has formed thereon between the upper and intermediate O-ring seals 122 a peripheral annular groove 123 which, as shown in the drawing illustrating the relative position of the parts of the self-lapping independent brake valve device 6 in the brake release position, is so located as to be opposite the location at which one end of a passageway 124 extending through the pipe bracket 111, the casing section 113 and the bushing 116 opens at the wall surface of the bore 115 in the bushing 116. Passageway 124 is connected by a pipe bearing the same numeral to one end of a pipe T 125 the opposite end of which is connected by pipe 126 to a vacuum control reservoir 127. The side outlet of the pipe T 125 is connected by a pipe and passageway 128 to the passageway 43 that opens into the chamber 36 above the diaphragm 12 of the brake control valve device 3. The purpose of the vacuum control reservoir 127 is to increase the volume of the chamber 36 above the diaphragm 12 of the brake control valve device 3.

Opening at the wall surface of the bore 115 in the bushing 116 at a short distance below the location at which the end of the passageway 124 opens into the bore 115, which distance is substantially equal to the length of the peripheral annular groove 123 on the spool type valve 114, is one end of a passageway 129 that extends through the bushing 116, casing section 113, and pipe bracket 111 and is connected by a corresponding pipe to the side outlet of the hereinbefore-mentioned pipe T 52.

The self-lapping valve portion 106 of the self-lapping type independent brake valve device 6 comprises a diaphragm 130 the outer periphery of which is clamped between the bottom of the casing section 113 and a spring housing 131 which is secured to the casing section 113 by any suitable means (not shown).

The diaphragm 130 cooperates with the casing section 113 and the spring housing 131 to form on opposite sides of the diaphragm a pair of chambers 132 and 133, the latter being open to atmosphere via an opening 134 in the spring housing 131.

The casing section 113 of the self-lapping type independent brake valve device 6 is provided with a bore 135 and a coaxial counterbore 136 which open respectively into a chamber 137 formed by the cooperative relationship of the casing section 113 and a cover member 138 secured thereto by any suitable means (not shown), and into the chamber 132 above the diaphragm 130. Slidably mounted in the lower end of the counterbore 136 is an exhaust valve seat member 139 on the lower end of which is formed a diaphragm follower 140 that abuts the upper side of the diaphragm 130 and has a screw-threaded stem that extends through the diaphragm and a second diaphragm follower 141 that abuts the lower side of the diaphragm 130 and receives a nut 142 which operatively connects the center of the diaphragm 130 to the diaphragm followers 140 and 141.

The exhaust valve seat member 139 is provided with a bore 143 and a coaxial counterbore 144, the upper end of the bore 143 being provided with an annular exhaust valve seat 145.

Slidably mounted in the counterbore 136 is a cup-shaped piston member 146 having a peripheral annular groove in which is disposed an O-ring seal 147 that forms a seal with the wall surface of the counterbore 136. The lower end of the cup-shaped piston member 146 is provided with an internally-threaded counterbore that has screw-threaded engagement with external screw threads formed on the upper end of a second cup-shaped piston member 148 that is slidably mounted in the counterbore 136 and is provided with a peripheral annular groove in which is disposed an O-ring seal 147 that also forms a seal with the wall surface of the counterbore 136. The second cup-shaped piston member 148 is provided with a bore 149, a coaxial counterbore 150, and a crosswise bore 151 that connects the interior of the counterbore 150 to a delivery chamber 152 formed within the counterbore 136 between the second cup-shaped piston member 148 and the exhaust valve seat member 139. Formed at the upper end of the counterbore 150 is an annular supply valve seat 153 against which a ball type supply valve 154 is normally biased by a spring 155 that is interposed between the supply valve 154 and the cup-shaped piston member 146. The supply valve 154 is connected to one end of a stem 156 that extends through the counterbore 150 and bore 149, and at its lower end is secured to a ball type exhaust valve 157. The exhaust valve 157 is normally biased out of seating contact with the annular exhaust valve seat member 145 by a spring 158 that is interposed between the lower side of the second cup-shaped piston member 148 and the bottom of the counterbore 144. Opening into the delivery chamber 152 is one end of a passageway 159 that extends through the casing section 113 and pipe bracket 111 to a tapped port opening at the right-hand face of the pipe bracket 111 and into which is received one threaded end of the hereinbeforementioned pipe 104. The passageway 159 is connected to the chamber 132 above the diaphragm 130 via a choke 160 so that, while the supply valve 154 is unseated from the annular valve seat 153, in a manner hereinafter described in detail, to effect the supply of fluid under pressure to the delivery chamber 152, this fluid under pressure will flow to the chamber 132 above the diaphragm 130 at a rate controlled by the size of the choke 160. Opening at the wall surface of the counterbore 136 in the casing section 113 above the second cup-shaped piston member 148 and below the first cup-shaped piston member 146 is one end of a passageway 161 that extends through the casing section 113 and pipe bracket 111 to a tapped port opening at the right-hand face of the pipe bracket and into which is received one threaded end of a pipe 162 that has its opposite end connected to that outlet of the pipe cross 61 that is opposite the outlet to which the pipe 62 is connected. Therefore, fluid under pressure flows from the main reservoir 2 via pipe 62, pipe cross 61, pipe 162, passageway 161, counterbore 136, and a crosswise bore 163 in the cup-shaped portion of the second cup-shaped piston member 148 to a supply valve chamber 164 formed in the cup-shaped piston member 146.

Interposed between the diaphragm follower 141 and a spring seat 165 is a diaphragm spring 166 that is effective to bias the diaphragm 130 and the exhaust valve seat member 139 in the direction of the ball type exhaust valve 157. The tension of the diaphragm spring 166 can be varied by means of a socket-head type spring adjusting screw 167 that has screw-threaded engagement with a member 168 carried by the spring housing 131 and is provided with a reduced portion 169 that extends through an aperture in the spring seat 165 and may be secured thereto as by riveting.

It should be understood that the above-described apparatus is limited to that necessary for a description of the present invention. The complete combined automatic compressed air and vacuum operated brake equipment for one unit of a multi-unit locomotive includes, in addition to the apparatus shown in the drawing, certain other conventional brake apparatus, such as an engineer's automatic brake valve device for effecting variations in a fluid pressure brake pipe, and a vacuum control valve device operative by variations in the pressure in the fluid pressure brake pipe to control communication between the vacuum reservoir and the vacuum brake pipe and between atmosphere and the vacuum brake pipe to thereby control the degree of vacuum in the vacuum brake pipe which, in turn, controls operation of the vacuum brake equipment on the cars in a train hauled by the locomotive.

*Operation*

Assume initially that the brake equipment shown in the drawing is the equipment on one unit of a multi-unit locomotive; that the apparatus is void of fluid under pressure, that is, it is at atmospheric pressure throughout; and that the handle 110 of the self-lapping type independent brake valve device 6 is in its "Release" position. Under these conditions, the various components of the apparatus will be in the respective positions in which they are shown in the drawing.

To initially charge the apparatus, the diesel engines are started for operating fluid compressors (not shown) to effect charging of the main reservoir 2, and for operating an exhauster (not shown) to effect evacuation of fluid under pressure from a vacuum reservoir (not shown).

To initially effect a release of the brakes, the engineer on the locomotive operates suitable conventional valve mechanism (not shown) to establish a communication between the vacuum reservoir and the vacuum brake pipe 4 so that the exhauster that is connected to the vacuum reservoir will be effective to evacuate fluid under pressure from the vacuum reservoir and the vacuum brake pipe 4.

The vacuum brake pipe 4 is connected to the passageway 46 in the service valve device 9 of the brake control valve device 3 via the side outlet of pipe T 49, pipe 48 and branch passageway 46a so that the chambers 37 and 45 are evacuated. As the chamber 45 is thus evacuated, atmospheric air from the chamber 36 above the diaphragm 12 and from the vacuum control reservoir 127 will be withdrawn respectively, via the passageway 43 and choke 44, and via the pipe 126, pipe T 125, pipe and passageway 128, passageway 43 and choke 44 to unseat the flat disc type valve 40 against the yielding resistance of the spring 41 and establish a communication between the chamber 36 and vacuum control reservoir 127 and the chamber 45 so that the chamber 36 and vacuum control reservoir 127 are evacuated simultaneously with the chambers 45 and 37. Since the chambers 36 and 37 are thus evacuated simultaneously, the various components of the service valve device 9 of the brake control valve device 3 on the locomotive unit will remain in their release position in which they are shown in the drawing to maintain the brakes on the locomotive unit released.

When the chambers 36 and 37 and the vacuum control reservoir 127 have been evacuated to the desired degree, the above-mentioned valve mechanism operates to a lap position to close the communication between the vacuum reservoir and the vacuum brake pipe 4 to prevent further evacuation of the vacuum brake pipe 4 by operation of the exhauster.

To manually effect a service application of brakes on the locomotive and connected cars of a train, the engineer will operate the above-mentioned valve mechanism in the usual way to admit atmospheric air into the vacuum brake pipe 4.

As atmospheric air is admitted to the vacuum brake pipe 4, it will flow therefrom to the chamber 37 in the service valve device 9 of the brake control valve device 3 via the side outlet of pipe T 49, pipe 48, branch passageway 46a and passageway 46, it being understood that the flat disc type valve 40 is pressed by spring 41 against its seat 42 to prevent flow from the passageway 46 and chamber 45 to the chamber 36 via passageway 43 and choke 44 therein so that the subatmospheric pressure or vacuum present in the chamber 36 is trapped therein.

The supply of atmospheric air to the chamber 37 below the diaphragm 12 in the manner just explained increases the pressure therein above that present in the chamber 36 above the diaphragm 12. Therefore, the higher pressure in the chamber 37 will deflect the diaphragm 12 in an upward direction and, through the intermediary of the pusher stem 38, move the valve stem 19 upward and cause the upper end thereof to first contact the bottom face of a flat disc type valve 170 disposed in the chamber 18 and biased by a spring 170a against an annular valve seat 171 formed at the upper end of the bore 17 to close communication between the pipe 51 and passageway 50 that opens at the wall surface of the bore 17 and atmosphere via passageway 29, peripheral annular groove 28, passageway 30 and brake cylinder exhaust choke 31. As the valve stem 19 continues to be moved upward, the flat disc valve 170 will be unseated from the annular valve seat 171 against the yielding resistance of the spring 170a. By unseating of the flat disc valve 170, fluid under pressure from the main reservoir 2 is permitted to flow by way of pipe 62, pipe cross 61, pipe 60, passageway 59, service choke 58 carried by the pipe bracket 7 and disposed in the passageway 59 to the chamber 18, thence past the now unseated flat disc valve 170 to the interior of the bore 17 from which it flows through passageway 50, pipe 51, pipe T 52, pipe 53, pipe T 54, pipe 103 double check valve device 102, and pipe and passageway 101 to the chamber 100 in the self-lapping relay valve device 5. Fluid under pressure also flows to the volume reservoir 56 via the side outlet of pipe T 54 and pipe 55. The self-lapping relay valve device 5 operates in the usual manner in response to the supply of fluid under pressure to the chamber 100 therein to effect the supply of a corresponding pressure from the main reservoir 2 to the brake cylinder device 1 on the locomotive unit to cause an application of the brakes.

Fluid under pressure flows from the passageway 50 in the brake control valve device 3 to the chamber 15 via branch passageway 50a and choke 57 and is effective to establish in the chamber 15 a force that acts in a downward direction on the upper side of the diaphragm 11. Upon this force slightly exceeding the force acting upward on the diaphragm 12 as a result of admitting the atmospheric air to the chamber 37, the valve stem 19 will be moved downward until the spring 170a seats the flat disc valve 170 on the annular valve seat 171. This cuts off the flow of fluid under pressure from the main reservoir 2 to the self-lapping type relay valve device 5 which, in turn, moves to a lap position to cut off flow of fluid under pressure to the brake cylinder device 1 on the locomotive. The seating of the flat disc valve 170 on the annular valve seat 171 is effective to hold the desired pressure of fluid in the pipe 101 connected to the self-lapping relay valve device 5 and hence in the brake cylinder device 1 on the locomotive.

It will be understood that each vacuum type brake cylinder device on each car on the train will operate in response to the admittance of atmospheric air to the train vacuum brake pipe to effect a brake application on the respective car corresponding to the increase in subatmospheric pressure effected in the train vacuum brake pipe.

To release the brake application on the locomotive and the connected cars of a train coupled thereto, the engineer operates the hereinbefore-mentioned valve mechanism to establish communication between the vacuum reservoir and the vacuum brake pipe 4 so that the exhauster that is connected to the vacuum reservoir on this locomotive unit operates to effect exacuation of the vacuum brake pipe 4 and the train vacuum brake pipe extending through the cars in the train.

Evacuation of the vacuum brake pipe 5 effects a corresponding evacuation of the chamber 37 in the brake control valve device 3 so that the pressure in the chamber 37 is reduced to the trapped subatmospheric pressure in the chamber 36. Evacuation of the chamber 37 renders the spring 25 effective to move the diaphragm 11 and the valve stem 19 downward whereupon the upper end of the valve stem 19 is moved away from the lower side of the flat disc valve 170 to the position shown in the drawing. Upon movement of the valve stem 19 to the position shown in the drawing, fluid under pressure is vented from the chamber 100 in the self-lapping type relay valve device 5 on the locomotive unit to atmosphere via passageway and pipe 101, double check valve device 102, pipe 103, pipe T 54, pipe 53, pipe T 52, pipe 51, passageway 50, bore 17, passageway 29 in the valve stem 19, peripheral annular groove 28 on the valve stem 19, passageway 30 and choke 31. Since chamber 15 is connected via choke 57 and branch passageway 50a to the passageway 50, and the volume reservoir 56 is connected via pipe 55 and the side outlet of the pipe T 54 to the pipe 53, the chamber 15 and the reservoir 56 are also vented to atmosphere. The self-lapping relay valve device 5 on the locomotive unit operates in response to venting of the chamber 100 therein in the usual way to correspondingly vent fluid under pressure from the brake cylinder device 1 on the locomotive unit to effect a release of the brakes on this unit.

Let it be supposed that the brakes on the locomotive unit and the cars in the train are released and that the engineer desires to effect a service application of the brakes on the locomotive unit only.

To effect an independent service application of the brakes on the locomotive unit only, the engineer will move the handle 110 of the self-lapping type independent brake valve device 6 on the locomotive unit arcuately from a "Release" position into a service zone an extent corresponding to the degree of service application desired. When the brake valve handle 110 is moved into the service zone, it is effective to rotate the cam shaft 109 and the cams 107 and 108 thereon. The contour of the cam 108 is such that as the cam shaft 109 is thus rotated, this cam is effective, through the intermediary of a cam dog 172, to move the cup-shaped piston members 146 and 148 downward against the yielding resistance of the spring 158, it being understood that the diaphragm spring 166 is stronger than the spring 158. As the cup-shaped piston members 146 and 148 are thus moved downward, the spring 155 is effective to maintain the ball type supply valve 154 in seating contact with the annular valve seat 153 so that the supply valve 154, stem 156 and ball type exhaust valve 157 are moved downward with the cup-shaped piston members 146 and 148 until the ball type exhaust valve 157 is moved into seating contact with the annular exhaust valve seat 145. With the ball type exhaust valve 157 in contact with the annular exhaust valve seat 145, the delivery chamber 152 is cut off from atmosphere via the bore 143, chamber 133 and the opening 134 in the spring housing 131.

Now as the cam 108 continues to be rotated, the cup-shaped piston members 146 and 148 are moved further downward so that the annular valve seat 153 is moved away from the ball type supply valve 154 which is connected by the stem 156 to the ball type exhaust valve 157 that is now in contact with the annular exhaust valve seat 145, it being understood that the diaphragm spring 166 is stronger than the spring 158. Upon movement of the annular valve seat 153 downward away from the ball type supply valve 154, fluid under pressure will flow from the main reservoir 2 to the chamber 100 in the self-lapping relay valve device 5 via pipe 62, pipe cross 61, pipe 162, passageway 161, counterbore 136, crosswise bore 163, supply valve chamber 164, past the now unseated supply valve 154, counterbore 150, crosswise bore 151 to the delivery chamber 152, thence via the passageway and pipe 159 to the left-hand end of the double check valve 102, and thence through the pipe 101 and corresponding passageway in the self-lapping relay valve device 5. Fluid under pressure supplied to the delivery chamber 152 in the manner just explained also flows therefrom via passageway 159 and the choke 160 to the chamber 132 above the diaphragm 130. As fluid under pressure is thus supplied to the chamber 132 the pressure therein will increase until the force exerted by this fluid under pressure on the diaphragm 130 is great enough to deflect the diaphragm 130 downward against the yielding force of diaphragm spring 166. As the diaphragm 130 is thus deflected downward, the diaphragm follower 140 and annular exhaust valve seat 145 move downward with the diaphragm. As the annular exhaust valve seat 145 is thus moved downward, the spring 155 is rendered effective through the intermediary of the supply valve 154 and stem 156 to maintain the exhaust valve 157 in seating contact with the annular exhaust valve seat 145 so that the supply valve 154, stem 156, and exhaust valve 157 move downward with the diaphragm 130, diaphragm follower 140, and annular exhaust valve seat 145 until the supply valve 154 contacts the annular valve seat 153. Upon the supply valve 154 contacting the annular valve seat 153, communication is closed between the interior of the counterbore 136 and the delivery chamber 152 thereby cutting off flow of fluid under pressure from the main reservoir 2 to the chamber 100 in the self-lapping relay valve device 5 and the chamber 132 above the diaphragm 130 of the self-lapping independent brake valve device 6.

From the foregoing, it should be apparent that the self-lapping valve portion 106 of the self-lapping type independent brake valve device 6 supplies fluid under pressure from the main reservoir 2 to the chamber 100 in the self-lapping type relay valve device 6 until the pressure therein is built up to a pressure corresponding to the extent to which the handle 110 of the self-lapping type independent brake valve device 6 was moved into its service application zone.

The fluid under pressure that is supplied to the chamber 100 of the self-lapping type relay valve device 5, in the manner just explained, is effective to operate this relay valve device in the usual manner to supply fluid under pressure to the brake cylinder device 1 to effect an application of the brakes on the locomotive unit.

To release the independent application of the brakes on the locomotive unit, the engineer will move the handle 110 of the independent brake valve device 6 from the position it occupies in its service zone back to its "Release" position. As the handle 110 is thus moved from the position it occupies in the service zone toward and to its "Release" position, the self-lapping valve portion 106 operates to correspondingly vent fluid under pressure from the chamber 100 of the relay valve device 5 on the locomotive unit whereupon this relay valve device operates to vent fluid under pressure from the brake cylinder device 1 to effect a release of the brakes on the locomotive unit. Since the operation of the self-lapping valve portion 106 of the independent brake valve device 6 and the operation of the relay valve device 5 are well known, a retailed description of the operation of these devices to release fluid under pressure to cause a release of the brakes is not deemed necessary.

Let it be supposed that a so-called automatic service application of the brakes on both the locomotive unit and the cars in the train hauled thereby has been effected in the manner hereinbefore described, and that, subsequent to thus effecting a service brake application, the engineer desires to effect an independent quick release of the brakes on the locomotive unit only.

To effect a quick release of the brakes on the locomotive unit only, the engineer will now move the operating handle 110 of the independent brake valve device 6 from its "Release" position arcuately in a direction opposite to the direction in which the handle 110 is moved to effect an independent brake application to a "Quick Release" position. As the handle 110 is moved arcuately from its "Release" position to its "Quick Release" position, it effects rotation of the cam shaft 109 and cams 107 and 108 therewith. The contour or shape of the cam 107 is such that, as the handle 110 is arcuately from its "Release" position to its "Quick Release" position, this cam is effective, through the intermediary of the stem 120, to move the spool type valve 114 downward, against the yielding resistance of the spring 121 from the position in which it is shown in the drawing to a position in which the peripheral annular groove 123 on the spool type valve 114 establishes a communication between the passageway 129 and passageway 124. Upon thus establishing a communication between the passageways 129 and 124, fluid under pressure will flow from the chamber 100 below the diaphragm 84 of the self-lapping relay valve device 5 to the chamber 36 above the diaphragm 12 of the brake control valve device 3 via passageway and pipe 101, double check valve device 102, pipe 103, pipe T 54, pipe 53, pipe T 52, pipe and passageway 129, peripheral annular groove 123 on the spool type valve 114, passageway and pipe 124, pipe T 125, pipe and passageway 128 and passageway 43. Since the vacuum control reservoir 127 is connected to the pipe 124 via the pipe 126 and pipe T 125, fluid under pressure will also flow from the chamber 100 to the vacuum control reservoir 127 until the pressures in the chamber 100, chamber 36 and the vacuum reservoir 127 are equalized.

The supply of fluid under pressure from the chamber 100 in the self-lapping relay valve device 5 to the chamber 36 above the diaphragm 12 of the brake control valve device 3 quickly establishes a pressure in the chamber 36 that is greater than the subatmospheric pressure or vacuum present in the chamber 37 below the diaphragm 12. Therefore, this difference in pressure in the chambers 36 and 37 on the opposite sides of the diaphragm 12 results in establishing a pressure differential that acts in the direction to deflect the diaphragm 12 downward, as viewed in the drawing until the diaphragm follower 34 abuts the cover 32. As the diaphragm 12 is thus deflected downward by the preponderance of pressure in the chamber 36, the spring 25 is rendered effective to move the diaphragm 11 and the valve stem 19 downward whereupon the upper end of the valve stem 19 downward whereupon the lower side of the flat disc valve 170 to the position shown in the drawing. Upon movement of the valve stem 19 to the position shown in the drawing, the fluid under pressure remaining in the chamber 100 of the self-tapping type relay valve device 6 is vented to atmosphere via passageway and pipe 101, double check valve device 102, pipe 103, pipe T 54, pipe 53, pipe T 52, pipe 51, passageway 50, bore 17, passageway 29 in the valve stem 19, peripheral annular groove 28 on the valve stem 19, passageway 30 and brake cylinder exhaust choke 31 therein. Since the chamber 15 is connected via choke 57 and branch passageway 50a to the passageway 50, and the volume reservoir 56 is connected via pipe 55 to the side outlet of pipe T 54, the chamber 15 and volume reservoir 56 are also vented to atmosphere.

Furthermore, the chamber 36 above the diaphragm 12 is now connected to atmosphere via passageway 43, passageway and corresponding pipe 128, pipe T 125, pipe and passageway 124, peripheral annular groove 123 on the spool type valve 114 of the self-lapping type independent brake valve device 6, passageway and pipe 129, pipe T 52, pipe 51, passageway 50, bore 17, passageway 29 in the valve stem 19, peripheral annular groove 28 on the valve stem 19, passageway 30 and brake cylinder exhaust choke 31 therein. Consequently, the fluid under pressure previously supplied to the chamber 36 from the chamber 100 in the relay valve device 5 is vented to atmosphere upon the valve stem 19 of the brake control valve device returning to the position shown in the drawing. Since the vacuum control reservoir 127 is connected to the chamber 36 via pipe 126, pipe T 125, pipe and passageway 128 and passageway 43, fluid under pressure previously supplied to the vacuum control reservoir 127 from the chamber 100 in the relay valve device 5 will be vented to atmosphere along with the fluid under pressure from the chamber 36 above the diaphragm 12 of the brake control valve device 3.

The relay valve device 5 operates in response to venting of the chamber 100 therein, in the usual manner, to correspondingly effect venting of fluid under pressure from the brake cylinder device 1 on the locomotive unit to atmosphere to effect a release of the brakes on this unit.

From the foregoing, it is apparent that the present invention provides for obtaining a more rapid independent release of the brakes on a locomotive only, subsequent to effecting a service brake application on the locomotive and on the cars in a train hauled thereby, that has been hitherto possible with present known combined compressed air and vacuum operation locomotive brake equipments. This is accomplished by effecting an equalization of pressures between the control chamber of the usual fluid pressure operated relay valve device, operative to effect the supply of fluid under pressure from a suitable storage reservoir to a brake cylinder device, and one side of a diaphragm of a brake control valve device. This diaphragm is normally subject on said one side and on its opposite side to the subatmospheric pressure or vacuum in a vacuum brake pipe and is effective in response to a reduction in the vacuum on said opposite side thereof by admitting atmospheric air to the vacuum brake pipe, under the control of the engineer, to cause operation of the brake control valve device to effect the supply of fluid under pressure from the storage reservoir to the relay valve device which, in turn, then operates to supply fluid under pressure to the brake cylinder device.

It should be understood that, subsequent to the engineer effecting an emergency brake application on the locomotive and on the cars in a train hauled thereby, or subsequent to an emergency brake application resulting from a ruptured hose connecting the vacuum brake pipe on one car in a train to the vacuum brake pipe on another car, or from any other cause, the engineer can effect an independent quick release of the brakes on the locomotive only in exactly the same manner as has been described in detail for effecting an independent quick release of the brakes on the locomotive subsequent to effecting a service brake application on the locomotive and the cars in a train hauled thereby.

Having now described the invention, what I claim as new and desire to secure by Letters Patent is:

1. In a combined compressed air and vacuum operated brake equipment for a railway locomotive, the combination of:
 (a) a vacuum brake pipe normally evacuated to a certain degree of vacuum in which the brakes are released, and subject to a certain reduction of vacuum therein to cause a brake application,
 (b) a brake control valve device comprising:
  (i) a diaphragm having a chamber on each side thereof, the chamber on one side of said diaphragm being in constant communication with said vacuum brake pipe,
  (ii) communication means between the chamber on the one side and the chamber on the other side of said diaphragm including choke means via which the evacuation of the chamber on the the other side of said diaphragm is effected while the chamber on the one side of the diaphragm is being evacuated, and
  (iii) a valve means controlled by said diaphragm, upon a predetermined reduction of the vacuum in said one chamber relative to that in said other chamber, to cause said valve means to operate to effect a supply of fluid at super-atmospheric pressure,
 (c) a relay valve device comprising:
  (i) fluid pressure operated self-lapping valve means responsive to the fluid at superatmospheric pressure supplied by said brake control valve device to effect the supply of fluid at super-atmospheric pressure to cause a brake application, and
 (d) independent brake valve means comprising:
  (i) an operating handle having a normal release position and being operative in one direction out of said release position to a quick release position, and
  (ii) valve means operative in response to movement of said operating handle to its quick release position to establish a communication through which fluid at super-atmospheric pressure acting on said relay valve device is discharged into said other chamber thereby to reduce the degree of vacuum therein such that said brake control valve device is restored promptly to its brake release position to cause a full release of the super-atmospheric pressure from said relay valve device thereby to cause said relay valve device to effect a full release of the brake application.

2. In a combined compressed air and vacuum operated brake equipment for a railway locomotive, the combination as claimed in claim 1, further characterized by check valve means in said communication means for preventing flow of fluid from the chamber at said one side of the diaphragm to the chamber at the other side of the diaphragm whereby to enable the reduction of vacuum in the chamber at the one side of the diaphragm without a reduction of vacuum in the chamber at the other side of the diaphragm.

3. In a combined compressed air and vacuum operated brake equipment for a railway locomotive, the combination of:
 (a) a storage reservoir normally charged to a predetermined super-atmospheric pressure,
 (b) a brake cylinder device for effecting a brake application on the locomotive,
 (c) a vacuum brake pipe normally evacuated to a certain degree of vacuum in which the brakes are released and subject to a certain reduction of vacuum therein to cause a brake application,
 (d) a brake control valve device comprising:
  (i) a diaphragm having a chamber on each side thereof, the chamber on one side of said diaphragm being in constant communication with said vacuum brake pipe,
  (ii) communication means between the chamber on the one side and the chamber on the other side of said diaphragm including choke means via which the evacuation of the chamber on the other side of said diaphragm is effected while the chamber on the one side of the diaphragm is being evacuated, and
  (iii) valve means controlled by said diaphragm upon the reduction of vacuum in said one chamber relative to that in said other chamber to cause said valve means to operate to effect a supply of super-atmospheric pressure from said storage reservoir,
 (e) a relay valve device comprising fluid pressure operative self-lapping valve means responsive to fluid at super-atmospheric pressure supplied from said storage reservoir by said brake control valve device to effect the supply of fluid at super-atmospheric pressure from said storage reservoir to said brake cylinder device to cause a brake application, and
 (f) an independent brake valve means comprising:

(i) an operating handle having a normal release position and being operative in one direction out of said release position to a quick release position, and (ii) valve means operative in response to movement of said handle to its quick release position to establish a communication through which fluid at super-atmospheric pressure acting on said relay valve device is discharged into said other chamber thereby to reduce the vacuum therein such that said brake control valve device is restored promptly to its brake release position to cause a full release of super-atmospheric pressure from said relay valve device thereby to cause said relay valve device to effect a full release of fluid at super-atmospheric pressure from said brake cylinder valve device to release the brakes on the locomotive.

4. In a combined compressed air and vacuum operated brake equipment for a locomotive, the combination as claimed in claim 1, further characterized in that the chamber on the other side of said diaphragm of said brake control valve device is vented to atmosphere via the communication established by said valve means of said independent brake valve means and said valve means of said brake control valve device upon operation of said valve means of said brake control valve device to its brake release position.

5. In a combined compressed air and vacuum operated brake equipment for a locomotive, the combination as claimed in claim 1, further characterized in that said independent brake valve means comprises a self-lapping valve mechanism operated by said operating handle, upon movement from its release position in the direction opposite said one direction into a service application zone, to effect the supply of fluid at super-atmospheric pressure to said relay valve device to cause said relay valve device to effect the supply of fluid at super-atmospheric pressure to cause a brake application on the locomotive independently of said brake control valve device.

6. In a combined compressed air and vacuum operated brake equipment for a locomotive, the combination as claimed in claim 3, further characterized in that said independent brake valve means comprises a self-lapping valve mechanism operated by said handle upon movement out of its release position in the direction opposite said one direction into a service application zone to effect a supply of fluid at super-atmospheric pressure from said storage reservoir to said relay valve device to cause said relay valve device to operate to effect a supply of fluid at super-atmospheric pressure from said storage reservoir to said brake cylinder device to cause a brake application on the locomotive.

No references cited.

EUGENE G. BOTZ, *Primary Examiner.*